US012683443B2

(12) United States Patent
Yang et al.

(10) Patent No.: US 12,683,443 B2
(45) Date of Patent: Jul. 14, 2026

(54) ROTOR STRUCTURE, ELECTRIC MOTOR STRUCTURE, AND CLOTHING TREATING DEVICE

(71) Applicants: GUANGDONG WELLING MOTOR MANUFACTURING CO., LTD., Foshan (CN); MIDEA WELLING MOTOR TECHNOLOGY (SHANGHAI) CO., LTD., Shanghai (CN)

(72) Inventors: Xiong Yang, Foshan (CN); Wenrui Li, Foshan (CN)

(73) Assignees: GUANGDONG WELLING MOTOR MANUFACTURING CO., LTD., Foshan (CN); MIDEA WELLING MOTOR TECHNOLOGY (SHANGHAI) CO., LTD, Shanghai (CN)

( * ) Notice: Subject to any disclaimer, the term of this patent is extended or adjusted under 35 U.S.C. 154(b) by 206 days.

(21) Appl. No.: 18/413,609

(22) Filed: Jan. 16, 2024

(65) Prior Publication Data

US 2024/0186851 A1     Jun. 6, 2024

Related U.S. Application Data

(63) Continuation of application No. PCT/CN2021/118058, filed on Sep. 13, 2021.

(30) Foreign Application Priority Data

Jul. 20, 2021    (CN) .......................... 202110821411.7
Jul. 20, 2021    (CN) .......................... 202121653333.6

(51) Int. Cl.
*H02K 1/27*         (2022.01)
*H02K 1/16*         (2006.01)
*H02K 1/276*        (2022.01)

(52) U.S. Cl.
CPC ............. *H02K 1/2766* (2013.01); *H02K 1/16* (2013.01); *H02K 2213/03* (2013.01)

(58) Field of Classification Search
CPC .... H02K 1/2766; H02K 1/16; H02K 2213/03; H02K 1/246; H02K 15/03; H02K 15/12; H02K 1/2773
See application file for complete search history.

(56) References Cited

U.S. PATENT DOCUMENTS 10,312,756 B2 *  6/2019  Bastien ............... H02K 1/2773
2011/0127859 A1   6/2011  Amrhein et al.
(Continued)

FOREIGN PATENT DOCUMENTS

CN        2086947 U     10/1991
CN       201975880 U     9/2011
(Continued)

OTHER PUBLICATIONS

First Office Action dated Dec. 2, 2024 received in Chinese Patent Application No. 2021108214117.
(Continued)

*Primary Examiner* — Thomas Truong
(74) *Attorney, Agent, or Firm* — SCULLY, SCOTT, MURPHY & PRESSER, P.C.

(57)     ABSTRACT

A rotor structure, an electric motor structure and a clothing treating device are provided. The rotor structure includes a rotor iron core, a permanent magnet and a magnetic barrier. The rotor iron core includes rotor punching sheets arranged in a stacked manner. Permanent magnet slots are provided in the rotor iron core and the permanent magnet is disposed in the permanent magnet slots. The rotor structure rotates in one direction or two directions in a circumferential direction. In the rotation direction of the rotor structure, the magnetic barrier is provided on at least one side of the permanent (Continued)

magnet slot, and two ends of the magnetic barrier face an outer edge of the permanent magnet and an outer edge of the rotor iron core, respectively. The magnetic barrier is provided on a first punching sheet or a second punching sheet of the rotor punching sheets.

12 Claims, 7 Drawing Sheets

(56)                     References Cited

U.S. PATENT DOCUMENTS

| | | | | |
|---|---|---|---|---|
| 2015/0270752 | A1* | 9/2015 | Tanaka | H02K 1/2766 |
| | | | | 310/156.56 |
| 2020/0161913 | A1* | 5/2020 | Nakahara | H02K 1/2773 |
| 2021/0384797 | A1* | 12/2021 | Cezario | H02K 7/04 |

FOREIGN PATENT DOCUMENTS

| | | | |
|---|---|---|---|
| CN | 102340225 | A | 2/2012 |
| CN | 102412646 | A | 4/2012 |
| CN | 102497045 | A | 6/2012 |
| CN | 204425064 | U | 6/2015 |
| CN | 110350694 | A | 10/2019 |
| CN | 110601396 | A | 12/2019 |
| CN | 110890825 | A | 3/2020 |
| CN | 110994825 | A | 4/2020 |
| CN | 211239476 | U | 8/2020 |
| CN | 211296516 | U | 8/2020 |
| CN | 111769671 | A | 10/2020 |
| CN | 212343465 | U | 1/2021 |
| CN | 113113992 | A | 7/2021 |
| CN | 215267841 | U | 12/2021 |
| DE | 19846924 | A1 | 4/2000 |
| DE | 102015001313 | A1 | 8/2016 |
| DE | 102019220509 | A1 | 6/2021 |
| JP | 2000270525 | A | 9/2000 |
| JP | 2009124916 | A | 6/2009 |
| JP | 2015061430 | A | 3/2015 |

OTHER PUBLICATIONS

International Search Report dated Mar. 1, 2022 issued in PCT/CN2021/118058.
Extended European search report dated Oct. 10, 2024 received in European Patent Application No. EP 21950712.6.
Wang, X., et al., "Electromagnetic Design of Brushless Doubly Fed Motor with Novel Rotor", EMCA, 2012, pp. 12-15.
Search Report dated Jul. 31, 2025 received in Chinese Patent Application No. 202110821411.7.

* cited by examiner 1083   1087

106

W 1084    1082    1082    1084

1084    1082    1082    1084

ROTOR STRUCTURE, ELECTRIC MOTOR STRUCTURE, AND CLOTHING TREATING DEVICE

CROSS-REFERENCE TO RELATED APPLICATIONS

This application is a continuation application of PCT International Patent Application No. PCT/CN2021/118058, filed on Sep. 13, 2021, which claims priority to Chinese Patent Application No. 202110821411.7 filed on Jul. 20, 2021 and Chinese Patent Application No. 202121653333.6 filed on Jul. 20, 2021, the entire contents of each of which are herein incorporated by reference for all purposes. No new matter has been introduced.

FIELD

The present disclosure relates to the field of clothing treating devices, and particularly, relates to a rotor structure, an electric motor structure, and a clothing treating device.

BACKGROUND

For a clothing treating device, the performance of the electric motor provided therein is a key factor, which determines the advantages and disadvantages of the use of the clothing treating device. Currently, the requirements for the performance and the performance-cost ratio of the electric motor become higher and higher gradually, and for the electric motor, under the effect of a cross-axis armature reaction, the degree of magnetic saturation of the electric motor will be deepened. Thus, improvement of the performance of the electric motor can be impeded. In the prior art, a magnetic barrier is often configured to solve the performance problem. However, for the current arrangement of the magnetic barrier, some materials, which affect magnetic conduction, may enter into the magnetic barrier during rotor injection molding, and thus the uniformity of the injection molding can be affected.

SUMMARY

The present disclosure aims to solve at least one of the problems existing in the prior art or related art.

Therefore, the embodiment of the first aspect of the present disclosure provides a rotor structure.

The embodiment of the second aspect of the present disclosure provides an electric motor structure.

The embodiment of the third aspect of the present disclosure provides a clothing treating device.

In order to achieve the above purposes, the embodiment of the first aspect of the present disclosure provides a rotor structure, including: a rotor iron core, and a plurality of permanent magnet slots are provided in the rotor iron core, the plurality of permanent magnet slots are arranged in a surrounding manner in the circumferential direction of the rotor iron core, and the rotor iron core comprises a plurality of rotor punching sheets arranged in a stacked manner; a permanent magnet, disposed in the permanent magnet slot; and a magnetic barrier, and the rotor structure is capable of rotating unidirectionally or bidirectionally along a circumferential direction, and in the rotation direction of the rotor structure, the magnetic barrier is provided on at least one side of the permanent magnet slot, with both ends of the magnetic barrier facing towards an outer edge of the permanent magnet and an outer edge of the rotor iron core respectively, and the plurality of rotor punching sheets comprise at least one first punching sheet and at least one second punching sheet, and the magnetic barrier is provided on the first punching sheet or the second punching sheet.

The rotor structure provided by the embodiment of the first aspect of the present disclosure comprises the rotor iron core and the permanent magnet provided in the rotor iron core, and under the action of the permanent magnet, the rotor structure can rotate with respect to a stator to achieve the normal operation of an electric motor. In an embodiment, the permanent magnet slot that passes through two end surfaces is provided in the rotor iron core, the permanent magnet can be disposed in the permanent magnet slot, and this helps the driving of the permanent magnet by a magnetic force. The rotor iron core is further provided with the magnetic barrier, the magnetic barrier can be used as a structure for alleviating the degree of magnetic saturation through defining that the extending directions of the two ends of the magnetic barrier face the permanent magnet and the outer edge, and thus, in the rotating process of the rotor structure, the power density and the torque density of the electric motor are enhanced, the overload capacity of the electric motor is enhanced, the torque ripple of the electric motor is effectively improved, on the basis of reducing the used amount of the permanent magnet of the electric motor, i.e., reducing the production costs, the performance of the electric motor is greatly improved, the performance-cost ratio of the electric motor using the rotor structure is enhanced, and the product competitiveness is enhanced.

It needs to be specially emphasized that the rotor iron core is mainly formed by a plurality of rotor punching sheets arranged in a stacked manner, the plurality of rotor punching sheets comprise at least two types: one type is a first punching sheet, and the other type is a second punching sheet, the magnetic barrier can be selectively arranged on the first punching sheet or the second punching sheet, and under the effect of the punching sheet without the magnetic barrier, some non-magnetically conductive materials which may hinder the normal processing of the rotor iron core are isolated, and the possibility that the non-magnetically conductive materials enter the magnetic barrier is reduced.

Since the rotation direction of the rotor structure in the present disclosure differs due to the limitation of the electric motor, in an embodiment, the rotor structure may be used for an unidirectional electric motor, and thus, for the unidirectional electric motor, the position of the magnetic barrier can be arranged based on the rotation direction of the rotor structure, to meet the needs on the performance of the electric motor on the basis of further reducing the processing cost.

Furthermore, in an embodiment, the magnetic barrier is only provided at one side of the permanent magnet slot, and in another embodiment, the magnetic barrier is provided at the two sides of the permanent magnet slot in the magnetization direction, i.e., the two sides of the rotor iron core in the circumferential direction.

For the rotor structure according to the present solution, firstly, on the basis of inhibiting the cross-axis armature reaction of the electric motor, alleviating the degree of magnetic saturation and reducing the load back electromotive force, and improving the torque density and overload capacity of the electric motor, the position of the magnetic barrier can be disposed based on the limitation of the rotation direction of the rotor structure; secondly, though disposing the magnetic barrier only on a portion of the rotor punching sheets, the possibility of entering the magnetic barrier and affecting the normal processing is reduced under the effect of the rotor punching sheets which are not provided with the magnetic barrier.

There can be multiple permanent magnet slots, and generally, the plurality of permanent magnet slots are arranged uniformly around the axis of the rotor iron core.

The extending direction of the permanent magnet slot can be the axial direction of the rotor iron core, and can further be a direction forming a certain angle with respect to the axial direction, and apparently, out of the consideration of processing costs and processing difficulty, generally, it is only necessary to arrange the permanent magnet slot along the axial direction, as along as the permanent magnet slot passes through the two end surfaces of the rotor iron core.

In addition, for the permanent magnet slot, it can be that at least one of the two ends passes through the end surface, in an embodiment, both of the two ends pass through the end surfaces, or one of the two ends passes through the end surface, and it can further be that neither of the two ends pass through the end surfaces.

It can be understood that for the rotor iron core, since the two ends of the magnetic barrier need to face the outer edge of the permanent magnet and the outer edge of the rotor iron core, the extending direction of the permanent magnet slot usually is a radial direction, and on the above basis, one end of the magnetic barrier needs to face the permanent magnet slot arranged along the radial direction, the other end needs to face the circumferential edge of the rotor iron core, and thus, for the magnetic barrier provided at the side surface of the permanent magnet slot, the magnetic barrier itself will have certain bending.

Apparently, the shape of the magnetic barrier can be a straight line, or a bending line, or a curve.

In addition, the rotor structure in the above embodiment provided by the present disclosure can further comprise the following additional features.

In the above embodiment, the magnetic barrier is provided on the first punching sheet, the second punching sheet is provided on at least one end of the rotor iron core along the axial direction of the rotor structure.

In the embodiment, through limiting that the magnetic barrier is only provided on the first punching sheet, the second punching sheet is provided at one end or on the two ends of the rotor iron core, the second punching sheet can be used as a structure for preventing non-magnetically conductive impurities to block the impurities outside the rotor iron core, and thus the normal operation of the rotor iron core is ensured.

In the above embodiment, there are multiple first punching sheets, the multiple first punching sheets are arranged adjacent to one another; and the number of the second punching sheets is two, and the two second punching sheets are respectively provided on the two ends of the rotor iron core.

In the embodiment, the number of the first punching sheets is defined to be multiple, and during the arrangement, multiple first punching sheets can be arranged adjacent to one another, and the multiple first punching sheets form an entirety with a relatively large thickness; on the above basis, through providing one second punching sheet respectively at the two ends, the possibility that the impurities flow into the magnetic barrier of the first punching sheet is reduced under the effect that the normal rotor iron core is ensured.

In the above embodiment, it further comprises: a first convex plate, provided on the first punching sheet, and the first convex plate extends to the outside from the inner wall of the side of the permanent magnet slot close to the axis; and a second convex plate, provided on the second punching sheet, and the second convex plate extends to the outside from the inner wall of the side of the permanent magnet slot close to the axis.

In the embodiment, through disposing the first convex plate and the second convex plate respectively on the first punching sheet and the second punching sheet, under the effect of the first convex plate and the second convex plate, the position of the permanent magnet in the permanent magnet slot can be limited. The first convex plate and the second convex plate are provided on the bottom of the permanent magnet slot, i.e., they are provided on the inner wall close to the axis of the entire rotor iron core, and on the above basis, it is limited that the first convex plate and the second convex plate extend to the outside.

The first convex plate and the second convex plate can extend to the outside along the radial direction, and can further extend to the outside along a direction which forms a certain angle with respect to the radial direction.

In the above embodiment, the plurality of rotor punching sheets further comprise a third punching sheet, provided at the middle portion of the rotor iron core along the axial direction of the rotor iron core.

In the embodiment, the rotor punching sheets further comprise the third punching sheet provided at the middle portion of the entire rotor iron core, the type of the third punching sheet is different from the types of both the first punching sheet and the second punching sheet, the third punching sheet is mainly configured to fix a magnetic tile, and since the third punching sheet is provided at the middle portion, the balance of the entire rotor iron core can further be improved.

In the above embodiment, it further comprises a third convex plate, provided on the third punching sheet, and the third convex plate extends from the inner side of the permanent magnet slot towards the permanent magnet, and the permanent magnet abuts against the third convex plate.

In the embodiment, through disposing the third convex plate located in the permanent magnet slot on the third punching sheet, the extending direction of the third convex plate is the direction facing the permanent magnet. On the above basis, through limiting the outward extension of the third convex plate and limiting the abutting between the permanent magnet and the third convex plate, the permanent magnet can get stuck under the effect of the third convex plate, and the possibility that the permanent magnet falls off is prevented.

Furthermore, the abutting between the permanent magnet and the third convex plate can be interference fit.

In the above embodiment, the third convex plate is provided on the inner wall of the side of the permanent magnet slot close to the axis, and the third convex plate extends to the outside along the radial direction; and/or in the circumferential direction of the rotor iron core, the third convex plate is provided on the inner wall of at least one side of the permanent magnet slot, and the third convex plate extends towards the inner wall of an opposite side along the circumferential direction.

In the embodiment, the third convex plate can be provided on the bottom of the permanent magnet slot, i.e., the inner wall of the side close to the axis, and at this moment, through limiting that the third convex plate extends to the outside in a radial direction, the permanent magnet can get stuck from the bottom, and thus the fixing of the permanent magnet can be achieved. In addition, the third convex plate can further be provided on the side portion of the permanent magnet, i.e., it is provided on the inner wall of the permanent magnet slot in the circumferential direction of the rotor iron core, and can further be provided on the inner walls of the two opposite sides or on the inner wall of a single side; through limiting that the third convex plate extends towards the inner wall of the opposite side along the circumferential direction, the permanent magnet can get stuck from the side portion, and thus the fixing of the permanent magnet can further be achieved.

In the above embodiment, the third convex plate has a height larger than that of the first convex plate; or the third convex plate has a height larger than that of the second convex plate.

In the embodiment, through limiting that the third convex plate has a height larger than that of the first convex plate or larger than that of the second convex plate, the third convex plate has a function of limiting the position of the permanent magnet. In other words, compared with the first convex plate and the second convex plate, the position of third convex plate is more prominent. It needs to be supplemented that the third convex plate is used as a main fixing structure, the first convex plate and the second convex plate can be used as auxiliary limiting structures, there may be a certain gap between the first convex plate and the permanent magnet, and there may further be a certain gap between the second convex plate and the permanent magnet.

In the above embodiment, the number of the third punching sheets is less than that of the first punching sheets; or the number of the third punching sheets is less than that of the second punching sheets.

In the embodiment, through limiting that the number of the third punching sheets is relatively small and the number is less than that of the first punching sheets or the second punching sheets, on the basis of limiting the position of the permanent magnet, this embodiment can inhibit the cross-axis armature reaction of the electric motor, alleviate the degree of magnetic saturation, reduce the load back electromotive force, and improve the torque density and overload capacity of the electric motor as much as possible.

In the above embodiment, for the first punching sheet, the second punching sheet and the third punching sheet, the magnetic barriers are located at the same side of the permanent magnet slot; or, for the first punching sheet, the second punching sheet and the third punching sheet, the position of the magnetic barrier of at least one of them with respect to the permanent magnet slot is different from the positions of the remaining magnetic barriers with respect to the permanent magnet slot.

In the embodiment, for the first punching sheet, the second punching sheet and the third punching sheet, the position of the magnetic barrier with respect to the permanent magnet slot is independent, and in an embodiment, it may be that on one type of rotor iron core, the magnetic barriers of the first punching sheet, the second punching sheet and the third punching sheet can all be disposed at the same side of the permanent magnet slot, and it may further be that on another type of rotor iron core, the position of the magnetic barrier on the first punching sheet is distinguished from the positions of the magnetic barriers on the other two punching sheets; likewise, the arrangement positions of the magnetic barriers can be combined at random, to meet different design needs.

It can be understood that the positions of the magnetic barriers with respect to the permanent magnet slots on each punching sheet are all independent, and can selectively be at a separate front side, a separate rear side or both sides.

In the above embodiment, it further comprises: a first injection molding hole, provided in the first punching sheet; a second injection molding hole, provided in the second punching sheet, and the second injection molding hole is provided corresponding to the first injection molding hole.

In the embodiment, through correspondingly providing the first injection molding hole and the second injection molding hole in the first punching sheet and the second punching sheet, it helps accomplish an injection molding process through the injection molding holes in the two punching sheets. Furthermore, for the arrangement that the first injection molding hole corresponds to the second injection molding hole, it can be that the two injection molding holes are coaxially arranged, or the two injection molding holes communicate with each other.

In the above embodiment, the rotor structure rotates in one direction, and in the rotation direction of the rotor structure, at least one magnetic barrier corresponding to each permanent magnet slot is provided at the front side of the permanent magnet slot.

In the embodiment, in the case that the rotor structure rotates in one direction, in the rotation direction of the rotor structure, through limiting that the magnetic barrier is provided at the front side of the permanent magnet slot, i.e., the magnetic barrier is provided at the weak magnetic side of the permanent magnet slot. During the rotation of the rotor structure, the permanent magnet will form the weak magnetic side and a strong magnetic side in the magnetization direction, and thus, inhibiting the cross-axis armature reaction of the electric motor is satisfied through providing the magnetic barrier at the weak magnetic side of the permanent magnet slot, to alleviate the degree of saturation of the rotor iron core.

It can be understood that the front side of the permanent magnet slot is the side of a fixed position that the rotor structure firstly passes during the rotating process. In an embodiment, when it rotates in a clockwise direction, the entire rotor structure is divided into multiple sector structures, and for each sector structure, if the permanent magnet slot is provided at the six o'clock direction, the magnetic barrier will be provided at the seven o'clock direction.

In the above embodiment, the magnetic barrier in an embodiment comprises: a first slot segment, extending towards the permanent magnet slot; and a second slot segment, communicating with the first slot segment, and extending towards the circumferential edge of the rotor iron core.

In the embodiment, the magnetic barrier mainly comprises two portions, and they are respectively the first slot segment and the second slot segment, and the first slot segment communicates with the second slot segment; the ends of the first slot segment and the second slot segment which deviate from each other respectively face the permanent magnet slot and the circumferential edge of the rotor iron core; the two portions of the magnetic barrier respectively face the structures of different positions, and the two portions need to communicate with each other, and thus, under the joint effect of the two portions, the effect can be achieved effectively that the cross-axis armature reaction of the electric motor is inhibited and the degree of magnetic saturation is alleviated.

In the above embodiment, in the cross section of the rotor iron core, the rotor iron core is divided into 2P sector areas by a plurality of permanent magnet slots, an included angle between the extending direction of the first slot segment and the extending direction of the permanent magnet slot is $[(180°/2P), 90°]$; in the cross section of the rotor iron core, an included angle between the extending direction of the second slot segment and the rotation direction of the rotor iron core is $[60°, 120°]$.

In the embodiment, through limiting the extending directions of the first slot segment and the second slot segment, under the effect of the magnetic barriers, the cross-axis armature reaction of the electric motor can be effectively inhibited, and the degree of magnetic saturation can be effectively alleviated, to enhance the power density and the torque density of the electric motor, enhance the overload capacity of the electric motor, and effectively improve the torque ripple of the electric motor. In an embodiment, the cross section of the rotor iron core is the normal plane of the axis of the rotor iron core; in the cross section, the included angle between the extending direction of the first slot segment and the extending direction of the permanent magnet slot is larger than or equal to (180°/2P), and less than or equal to 90°; 2P is the number of the sector areas; when the shape of the cross section of the rotor iron core is a circular shape, 2P is the number of the permanent magnet slots. Alternatively, in the cross section, the extending direction of the second slot segment can be orthogonal or approximately orthogonal to the rotation direction of the rotor iron core, and the angle range of them can be larger than or equal to 60°, and less than or equal to 120°.

The embodiment according to the second aspect of the present disclosure provides an electric motor structure, including; a stator; the rotor structure in the embodiments of the first aspect, coaxially arranged with the stator, and the rotor structure can rotate with respect to the stator.

The electric motor structure provided by the embodiment of the second aspect of the present disclosure comprises the stator and the rotor structure, and the electric motor structure is provided with the rotor structure in the embodiments of the first aspect therein, and thus has all the advantageous effects of any rotor structure, which will not be repeated herein.

It needs to be emphasized that the electric motor structure comprises the above rotor structure, and therefore, firstly, the cross-axis armature reaction of the electric motor is effectively inhibited, the degree of magnetic saturation is alleviated, the load back electromotive force is reduced, and the torque density and the overload capacity of the electric motor are improved; secondly, the magnetic field harmonics of the rotor in an air gap can be weakened, and the torque ripple of the electric motor can be improved.

The embodiment according to the third aspect of the present disclosure provides a clothing treating device, including: a housing; and the electric motor structure in the embodiment of the above second aspect, provided in the housing.

The clothing treating device provided in the embodiment of the third aspect of the present disclosure comprises the housing and the electric motor structure provided in the housing, an outdoor unit is provided with the electric motor structure in the embodiment of the above second aspect, and thus has all the advantageous effects of the above electric motor structure, which will not be repeated herein.

The additional aspects and advantages of the present disclosure will be obvious in the following description, or can be understood through the practice of the present disclosure.

The corresponding relations between the reference signs and the component names in FIG. 1 to FIG. 14 are as follow:

100: rotor structure; 102: rotor iron core; 1022: rotor punching sheet; 103: permanent magnet slot; 104: permanent magnet; 106: magnetic barrier; 1062: first slot segment; 1064: second slot segment; 1082: first punching sheet; 1083: first convex plate; 1084: second punching sheet; 1085: second convex plate; 1086: third punching sheet; 1087: third convex plate; 1102: first injection molding hole; 1104: second injection molding hole; 1106: third injection molding hole; 200: electric motor structure; 202: stator; 204: air gap; 300: clothing treating device; and 302: housing.

DETAILED DESCRIPTION OF DISCLOSURE

To more clearly understand the above purposes, features and advantages of the embodiments of the present disclosure, the embodiments of the present disclosure will be further detailed hereinafter in combination with the accompanying drawings and embodiments. It should be indicated that in the case of no conflict, the embodiments and the features in the embodiments of the present disclosure can be combined with each other.

Many details are illustrated in the following description for the convenience of a thorough understanding to the present disclosure, but the embodiments of the present disclosure can further be implemented using other embodiments other than these described herein. Therefore, the protection scope of the present disclosure is not limited to the embodiments disclosed in the following text.

Some embodiments of the present disclosure are described in the following by referring to FIG. 1 to FIG. 14.

As shown in FIG. 1 to FIG. 5, a rotor structure 100 provided by the embodiment comprises a rotor iron core 102 and a permanent magnet 104 provided in the rotor iron core 102, and under the action of the permanent magnet 104, the rotor structure 100 can rotate with respect to a stator to achieve the normal operation of an electric motor.

Figure 2:
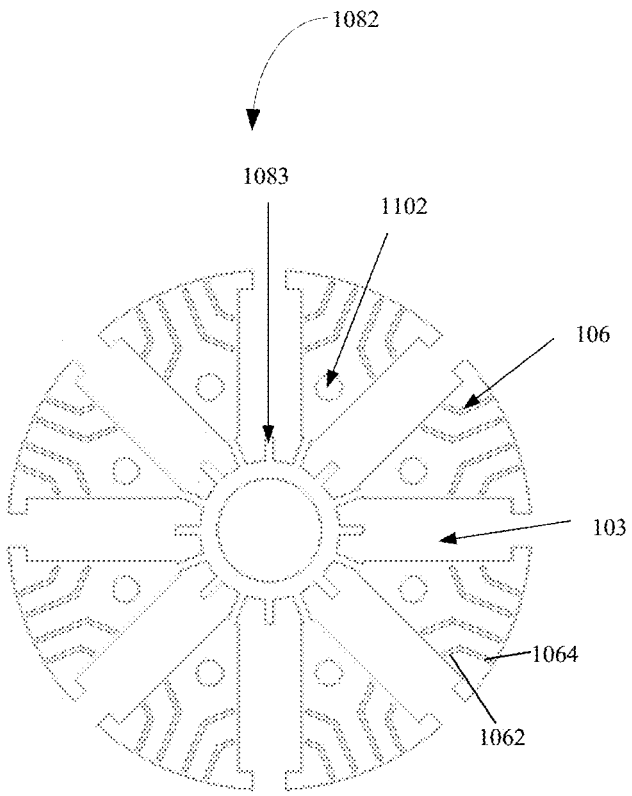
FIG. 2 is a schematic view of the structure of a first punching sheet according to an embodiment of the present disclosure.
Figure 3:
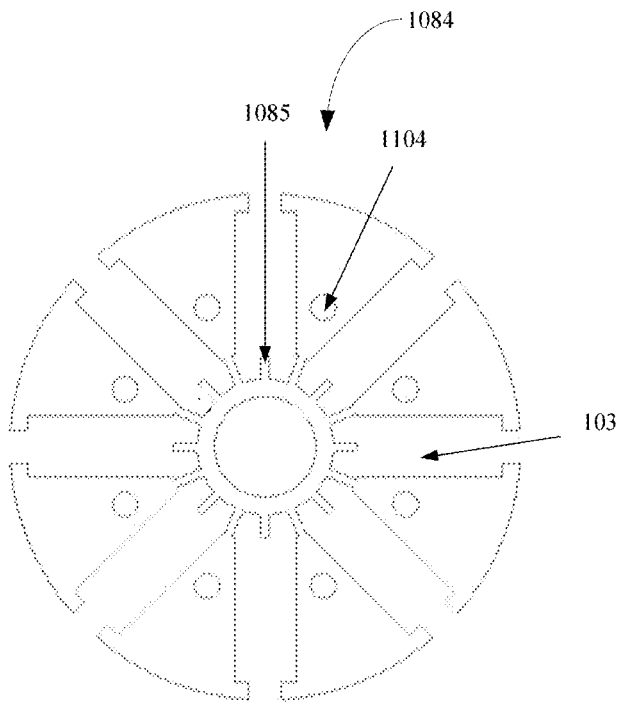
FIG. 3 is a schematic view of the structure of a second punching sheet according to an embodiment of the present disclosure.

In an embodiment, as shown in FIG. 2 and FIG. 3, a permanent magnet slot 103 is provided in the rotor iron core 102, the permanent magnet 104 can be disposed in the permanent magnet slot 103, and this helps the driving of the permanent magnet 104 by a magnetic force. The rotor iron core 102 is further provided with a magnetic barrier 106, the magnetic barrier 106 can be used as a structure for alleviating the degree of magnetic saturation through defining that the extending directions of the two ends of the magnetic barrier 106 face the permanent magnet 104 and the outer edge, and thus, in the rotating process of the rotor structure 100, the power density and the torque density of the electric motor are enhanced, the overload capacity of the electric motor is enhanced, the torque ripple of the electric motor is effectively improved, on the basis of reducing the used amount of the permanent magnet of the electric motor, i.e., reducing the production costs, the performance of the electric motor is greatly improved, the performance-cost ratio of the electric motor using the rotor structure 100 is enhanced, and the product competitiveness is enhanced.

The permanent magnet slot 103 can pass through the two end surfaces of the rotor iron core 102.

In one embodiment, the projection of the magnetic barrier on the end surface of the rotor iron core presents a straightline shape.

In another embodiment, the projection of the magnetic barrier on the end surface of the rotor iron core presents a bending line shape.

In another embodiment, the projection of the magnetic barrier on the end surface of the rotor iron core presents a curve shape.

It needs to be specially emphasized that the rotor iron core 102 is mainly formed by a plurality of rotor punching sheets 1022 arranged in a stacked manner, the plurality of rotor punching sheets 1022 comprise at least two types: one type is a first punching sheet 1082, and the other type is a second punching sheet 1084, the magnetic barrier 106 can be selectively arranged on the first punching sheet 1082 or the second punching sheet 1084, and under the effect of the punching sheet without the magnetic barrier 106, some non-magnetically conductive materials which may hinder the normal processing of the rotor iron core 102 are isolated, and the possibility that the non-magnetically conductive materials enter the magnetic barrier 106 is reduced.

Since the rotation direction of the rotor structure 100 in the present disclosure differs due to the limitation of the electric motor, in an embodiment, the rotor structure may be used for an unidirectional electric motor, and thus, for the unidirectional electric motor, the position of the magnetic barrier 106 can be arranged based on the rotation direction of the rotor structure 100, to meet the needs on the performance of the electric motor on the basis of further reducing the processing cost.

Furthermore, in one embodiment, the magnetic barrier 106 is only provided at one side of the permanent magnet slot 103. Furthermore, the magnetic barrier 106 is provided at the weak magnetic side of the permanent magnet slot 103. Understandably, during the rotation of the rotor structure 100, the permanent magnet 104 will form the weak magnetic side and a strong magnetic side in the magnetization direction, i.e., inhibiting the cross-axis armature reaction of the electric motor is satisfied, to alleviate the degree of saturation of the rotor iron core 102.

In an embodiment, in the case that the rotor structure 100 rotates in one direction, in the rotation direction of the rotor structure 100, through limiting that the magnetic barrier 106 is provided at the front side of the permanent magnet slot 103, i.e., the magnetic barrier 106 is provided at the weak magnetic side of the permanent magnet slot 103. During the rotation of the rotor structure 100, the permanent magnet 104 will form the weak magnetic side and the strong magnetic side in the magnetization direction, and thus, inhibiting the cross-axis armature reaction of the electric motor is satisfied through providing the magnetic barrier 106 at the weak magnetic side of the permanent magnet slot 103, to alleviate the degree of saturation of the rotor iron core 102.

Figure 9:
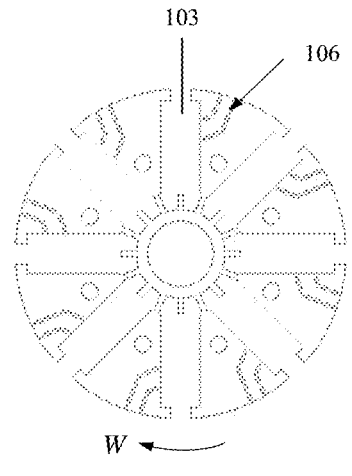
FIG. 9 is a schematic view of the structure of a rotor structure according to an embodiment of the present disclosure.

It can be understood that the front side of the permanent magnet slot 103 is the side of a fixed position that the rotor structure firstly passes during the rotating process. In an embodiment, as shown in FIG. 9, when it rotates in a clockwise direction, the entire rotor structure 100 is divided into multiple sector structures, and for each sector structure, if the permanent magnet slot 103 is provided at the twelve o'clock direction, the magnetic barrier 106 will be provided at the one o'clock direction.

Figure 8:
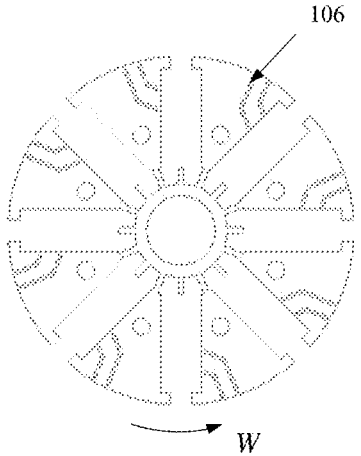
FIG. 8 is a schematic view of the structure of a rotor structure according to an embodiment of the present disclosure.

Likewise, as shown in FIG. 8, if the rotor structure rotates in a counterclockwise direction, the magnetic barrier 106 is provided at the rear side of the permanent magnet slot 103, and for each sector structure, if the permanent magnet slot 103 is provided at the twelve o'clock direction, the magnetic barrier 106 will be provided at the eleven o'clock direction.

In another embodiment, the magnetic barrier 106 is provided at the two sides of the permanent magnet slot 103 in the magnetization direction, i.e., the two sides of the rotor iron core 102 in the circumferential direction.

For the rotor structure 100 according to the present solution, firstly, it effectively inhibits the cross-axis armature reaction of the electric motor, alleviates the degree of magnetic saturation, reduces the load back electromotive force, and improves the torque density and overload capacity of the electric motor; secondly, since the magnetic barrier 106 is formed by hollowing out the rotor iron core 102, the used amount of rare-earth permanent magnets 104 can further be reduced.

There can be multiple permanent magnet slots 103, and generally, the plurality of permanent magnet slots 103 are arranged uniformly around the axis of the rotor iron core 102.

The extending direction of the permanent magnet slot 103 can be the axial direction of the rotor iron core 102, and can further be a direction forming a certain angle with respect to the axial direction, and apparently, out of the consideration of processing costs and processing difficulty, generally, it is only necessary to arrange the permanent magnet slot 103 along the axial direction, as along as the permanent magnet slot passes through the two end surfaces of the rotor iron core 102.

In addition, for the permanent magnet slot 103, it can be that at least one of the two ends passes through the end surface, in an embodiment, both of the two ends pass through the end surfaces, or one of the two ends passes through the end surface, and it can further be that neither of the two ends pass through the end surfaces.

It can be understood that for the rotor iron core 102, since the two ends of the magnetic barrier need to face the outer edge of the permanent magnet and the outer edge of the rotor iron core, the extending direction of the permanent magnet slot usually is a radial direction, and on the above basis, one end of the magnetic barrier needs to face the permanent magnet slot arranged along the radial direction, the other end needs to face the circumferential edge of the rotor iron core, and thus, for the magnetic barrier provided at the side surface of the permanent magnet slot, the magnetic barrier itself will have certain bending.

Apparently, the shape of the magnetic barrier can be a straight line, or a bending line, or a curve.

Furthermore, for the convenience of processing, the rotor iron core 102 is mainly composed by a plurality of rotor punching sheets 1022, and the rotor iron core 102 can be formed by assembling the plurality of rotor punching sheets 1022 in a stacked manner.

Furthermore, the rotor iron core 102 can be an integrated structure, and can further be a multi-segment structure, in an embodiment, if it is a multi-segment structure, the punching sheets arranged in the stacked manner can be divided into multiple segments, each segment is composed by a plurality of punching sheets, and the rotor iron core 102 can be formed through arranging the multiple segments of the iron core segments along the axial direction, and thus the electromagnetic effect of the rotor in the electric motor is achieved.

In an embodiment, the cross section of the rotor iron core 102 is a circular shape, and the entirety of the rotor iron core 102 is a cylindrical shape; through providing an even number of the permanent magnet slots 103, and the rotor iron core 102 can be divided into the same number of sector areas; it can be understood that the permanent magnet slots 103 can be disposed uniformly around the axis on the rotor iron core 102, and the two sides of each sector area in the circumferential direction are respectively a permanent magnet slot 103, and this firstly helps the mounting of the permanent magnets 104 and secondly helps the integral processing and assembling.

Figure 1:
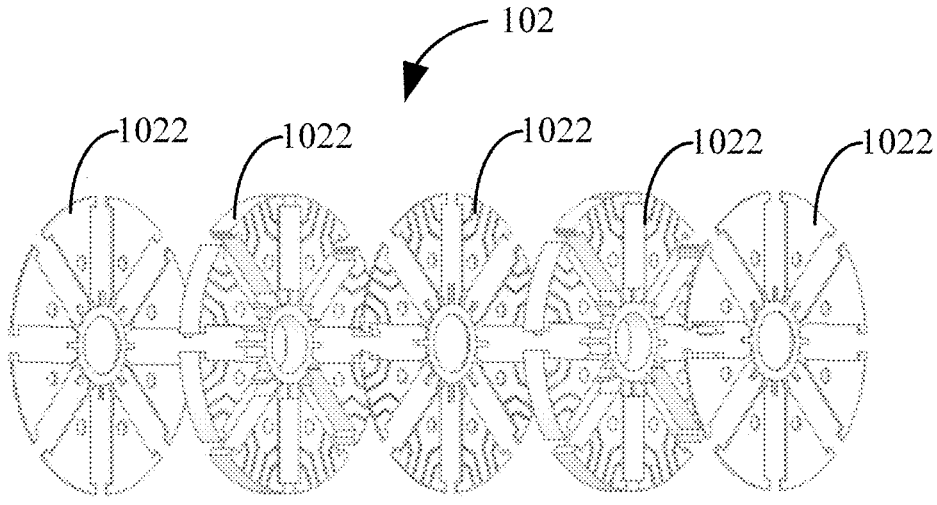
FIG. 1 is a schematic view of the structure of a rotor iron core according to an embodiment of the present disclosure.

As shown in FIG. 1, a rotor structure 100 provided by the embodiment comprises a rotor iron core 102 and a permanent magnet 104 provided in the rotor iron core 102, and under the action of the permanent magnet 104, the rotor structure 100 can rotate with respect to a stator to achieve the normal operation of an electric motor.

It needs to be specially emphasized that the rotor iron core 102 is mainly formed by a plurality of rotor punching sheets 1022 arranged in a stacked manner, the plurality of rotor punching sheets 1022 comprise at least two types: one type is a first punching sheet 1082, and the other type is a second punching sheet 1084, a magnetic barrier 106 can be selectively arranged on a first punching sheet 1082 or a second punching sheet 1084, and under the effect of the punching sheet without the magnetic barrier 106, some non-magnetically conductive materials which may hinder the normal processing of the rotor iron core 102 are isolated, and the possibility that the non-magnetically conductive materials enter the magnetic barrier 106 is reduced.

In an embodiment, a permanent magnet slot 103 is provided in the rotor iron core 102, the permanent magnet 104 can be disposed in the permanent magnet slot 103, and this helps the driving of the permanent magnet 104 by a magnetic force. The rotor iron core 102 is further provided with the magnetic barrier 106, the magnetic barrier 106 can be used as a structure for alleviating the degree of magnetic saturation through defining that the extending directions of the two ends of the magnetic barrier 106 face the permanent magnet 104 and the outer edge, and thus, in the rotating process of the rotor structure 100, the power density and the torque density of the electric motor are enhanced, the overload capacity of the electric motor is enhanced, the torque ripple of the electric motor is effectively improved, on the basis of reducing the used amount of the permanent magnet of the electric motor, i.e., reducing the production costs, the performance of the electric motor is greatly improved, the performance-cost ratio of the electric motor using the rotor structure 100 is enhanced, and the product competitiveness is enhanced.

The permanent magnet slot 103 can pass through the two end surfaces of the rotor iron core 102.

The magnetic barrier 106 is only provided on the first punching sheet 1082, the second punching sheet 1084 is provided at one end or on the two ends of the rotor iron core along the axial direction of the rotor structure, the second punching sheet 1084 can be used as a structure for preventing non-magnetically conductive impurities to block the impurities outside the rotor iron core 102, and thus the normal processing of the rotor iron core 102 is ensured.

Furthermore, the number of the first punching sheets 1082 is defined to be multiple, and during the arrangement, multiple first punching sheets 1082 can be arranged adjacent to one another, and the multiple first punching sheets 1082 form an entirety with a relatively large thickness; on the above basis, through providing one second punching sheet 1084 respectively at the two ends, the possibility that the impurities flow into the magnetic barrier 106 of the first punching sheet 1082 is reduced under the effect that the normal rotor iron core 102 is ensured.

Through disposing a first convex plate 1083 and a second convex plate 1085 respectively on the first punching sheet 1082 and the second punching sheet 1084, under the effect of the first convex plate 1083 and the second convex plate 1085, the position of the permanent magnet 104 in the permanent magnet slot 103 can be limited. In an embodiment, the first convex plate 1083 and the second convex plate 1085 are provided on the bottom of the permanent magnet slot 103, i.e., they are provided on the inner wall close to the axis of the entire rotor iron core 102, and on the above basis, the outward extension of the first convex plate 1083 and the second convex plate 1085 is limited, that is, the first convex plate and the second convex plate are respectively provided on the first punching sheet and the second punching sheet, and both of them extend to the outside from the inner wall of the side of the permanent magnet slot close to the axis.

The first convex plate 1083 and the second convex plate 1085 can extend to the outside along the radial direction, and can further extend to the outside along a direction which forms a certain angle with respect to the radial direction.

In an embodiment, the shape of the cross section of the permanent magnet slot 103 is a polygon, and the polygonal permanent magnet slot 103 can better help occupy the space of the rotor iron core 102, i.e., it can sufficiently use the space of the iron core in the rotor, and the torque density is optimized.

Figure 4:
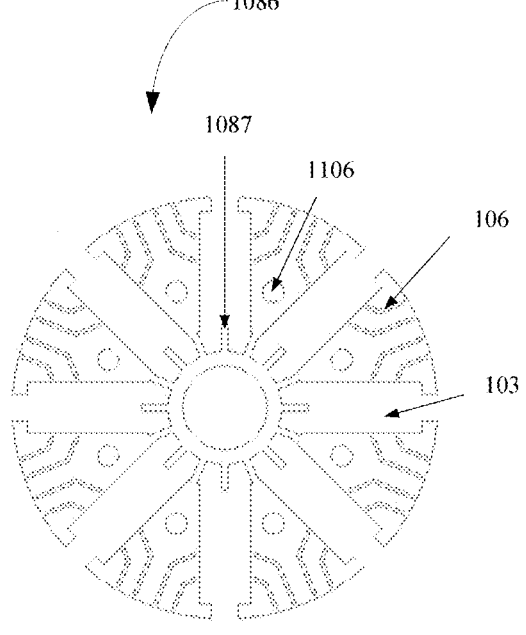
FIG. 4 is a schematic view of the structure of a third punching sheet according to an embodiment of the present disclosure.
Figure 5:
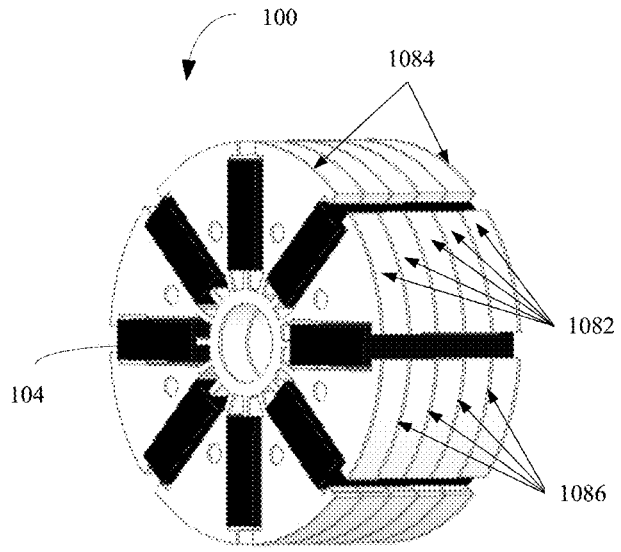
FIG. 5 is a schematic view of the structure of a rotor structure according to an embodiment of the present disclosure.

As shown in FIG. 4 and FIG. 5, a rotor structure 100 provided by the embodiment comprises a rotor iron core 102 and a permanent magnet 104 provided in the rotor iron core 102, and under the action of the permanent magnet 104, the rotor structure 100 can rotate with respect to a stator to achieve the normal operation of an electric motor.

It needs to be specially emphasized that the rotor iron core 102 is mainly formed by a plurality of rotor punching sheets 1022 arranged in a stacked manner, the plurality of rotor punching sheets 1022 comprise three types: one type is a first punching sheet 1082, another type is a second punching sheet 1084 and the last type is a third punching sheet 1086, the magnetic barrier 106 can be selectively arranged on the first punching sheet 1082 or the second punching sheet 1084, and under the effect of the punching sheet without the magnetic barrier 106, some non-magnetically conductive materials which may hinder the normal processing of the rotor iron core 102 are isolated, and the possibility that the non-magnetically conductive materials enter the magnetic barrier 106 is reduced.

The third punching sheet 1086 is further provided with a third injection molding hole 1106, and apparently, the third punching sheet can further be selectively provided with the magnetic barrier 106.

The third punching sheet 1086 is provided at the middle portion of the entire rotor iron core 102; the type of the third punching sheet 1086 is different from the types of both the first punching sheet 1082 and the second punching sheet 1084, the third punching sheet 1086 is mainly configured to fix a magnetic tile, and since the third punching sheet 1086 is provided at the middle portion, the balance of the entire rotor iron core 102 can further be improved.

Figure 6:
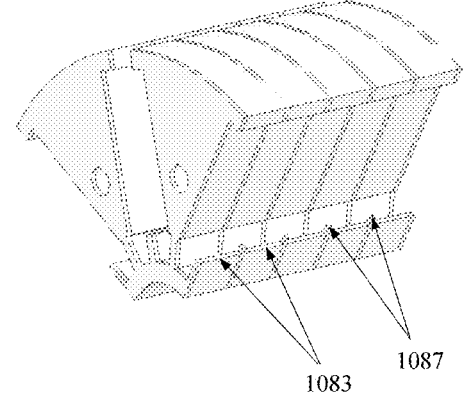
FIG. 6 is a schematic view of a portion of the structure of a rotor structure according to an embodiment of the present disclosure.

In one embodiment, as shown in FIG. 6, a third convex plate 1087 located on the bottom of the permanent magnet slot 103 can further be provided on the third punching sheet 1086, i.e., the third convex plate 1087 is provided at the end of the permanent magnet slot 103 close the axis. On the above basis, through limiting the outward extension of the third convex plate 1087 and limiting the abutting between the permanent magnet 104 and the third convex plate 1087, the permanent magnet 104 can get stuck under the effect of the third convex plate 1087, and the possibility that the permanent magnet 104 falls off is prevented.

Figure 7:
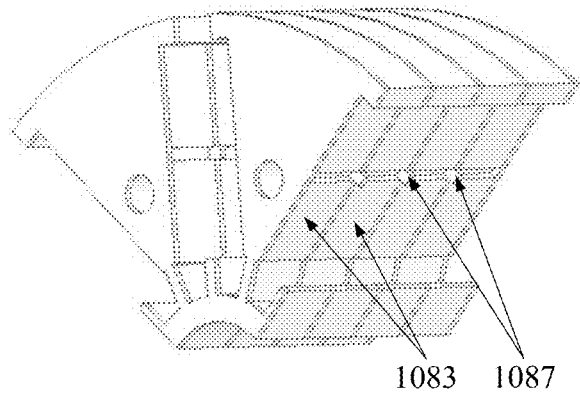
FIG. 7 is a schematic view of the structure of a rotor structure according to an embodiment of the present disclosure.

In another embodiment, as shown in FIG. 7, the third convex plate 1087 can further be provided on the side portion of the permanent magnet, i.e., it is provided on the inner wall of the permanent magnet slot in the circumferential direction of the rotor iron core, and can further be provided on the inner walls of the two opposite sides or on the inner wall of a single side; through limiting that the third convex plate extends towards the inner wall of the opposite side along the circumferential direction, the permanent magnet can get stuck from the side portion, and thus the fixing of the permanent magnet can further be achieved.

Furthermore, the abutting between the permanent magnet 104 and the third convex plate 1087 can be interference fit.

In an embodiment, the permanent magnet slot 103 is provided in the rotor iron core 102, the permanent magnet 104 can be disposed in the permanent magnet slot 103, and this helps the driving of the permanent magnet 104 by a magnetic force. The rotor iron core 102 is further provided with the magnetic barrier 106, the magnetic barrier 106 can be used as a structure for alleviating the degree of magnetic saturation through defining that the extending directions of the two ends of the magnetic barrier 106 face the permanent magnet 104 and the outer edge, and thus, in the rotating process of the rotor structure 100, the power density and the torque density of the electric motor are enhanced, the overload capacity of the electric motor is enhanced, the torque ripple of the electric motor is effectively improved, on the basis of reducing the used amount of the permanent magnet of the electric motor, i.e., reducing the production costs, the performance of the electric motor is greatly improved, the performance-cost ratio of the electric motor using the rotor structure 100 is enhanced, and the product competitiveness is enhanced.

The permanent magnet slot 103 can pass through the two end surfaces of the rotor iron core 102.

As shown in FIG. 6 and FIG. 7, in one embodiment, the third convex plate 1087 has a height larger than that of the first convex plate 1083.

In another embodiment, the third convex plate 1087 has a height larger than that of the second convex plate 1085.

Through limiting that the third convex plate 1087 has a height larger than that of the first convex plate 1083 or larger than that of the second convex plate 1085, the third convex plate 1087 has a function of limiting the position of the permanent magnet 104. In other words, compared with the first convex plate 1083 and the second convex plate 1085, the position of third convex plate 1087 is more prominent. It needs to be supplemented that the third convex plate 1087 is used as a main fixing structure, the first convex plate 1083 and the second convex plate 1085 can be used as auxiliary limiting structures, there may be a certain gap between the first convex plate 1083 and the permanent magnet 104, and there may further be a certain gap between the second convex plate 1085 and the permanent magnet 104.

Furthermore, as shown in FIG. 6, the first punching sheet, the second punching sheet and the third punching sheet are stacked axially; the first punching sheet prevents an injection molding liquid from entering the magnetic barrier; the third punching sheet has the function of fixing a magnetic tile. The manner for the third punching sheet to fix the magnetic tile is to fix the magnetic tile on the bottom portion of the permanent magnets.

As shown in FIG. 7, the first punching sheet, the second punching sheet and the third punching sheet are stacked axially; the first punching sheet prevents an injection molding liquid from entering the magnetic barrier; the third punching sheet has the function of fixing a magnetic tile. The manner for the third type of punching sheet to fix the magnetic tile is to fix the magnetic tile on the side portion of the permanent magnets.

In one embodiment, the number of the third punching sheets 1086 is less than that of the first punching sheets 1082.

In another embodiment, the number of the third punching sheets 1086 is less than that of the second punching sheets 1084.

Through limiting that the number of the third punching sheets 1086 is relatively small and the number is less than that of the first punching sheets 1082 or the second punching sheets 1084, on the basis of limiting the position of the permanent magnet 104, this embodiment can inhibit the cross-axis armature reaction of the electric motor, alleviate the degree of magnetic saturation, reduce the load back electromotive force, and improve the torque density and overload capacity of the electric motor as much as possible.

In addition, for the first punching sheet, the second punching sheet and the third punching sheet, the position of the magnetic barrier with respect to the permanent magnet slot is independent, and in an embodiment, it may be that on one type of rotor iron core, the magnetic barriers of the first punching sheet, the second punching sheet and the third punching sheet can all be disposed at the same side of the permanent magnet slot, and it may further be that on another type of rotor iron core, the position of the magnetic barrier on the first punching sheet is distinguished from the positions of the magnetic barriers on the other two punching sheets; likewise, the arrangement positions of the magnetic barriers can be combined at random, to meet different design needs.

It can be understood that the positions of the magnetic barriers with respect to the permanent magnet slots on each punching sheet are all independent, and can selectively be at a separate front side, a separate rear side or both sides.

Furthermore, when the third punching sheet is not provided, in the first punching sheet and the second punching sheet, the position of the magnetic barrier with respect to the permanent magnet slot can further be independent.

In an embodiment, the magnetic barrier on the first punching sheet is provided at the front side of the permanent magnet slot, and the magnetic barrier on the second punching sheet is provided at the rear side of the permanent magnet slot.

In another embodiment, the magnetic barriers on both the first punching sheet and the second punching sheet are provided at the front side of the permanent magnet slot, or the magnetic barriers on both the first punching sheet and the second punching sheet are provided at the rear side of the permanent magnet slot.

Based on the same reasons, for the rotor iron core added with the third punching sheet, the magnetic barrier can be provided at any random position on any type of punching sheet with respect to the permanent magnet slot.

As shown in FIG. 1, a rotor structure 100 provided by the embodiment comprises a rotor iron core 102 and a permanent magnet 104 provided in the rotor iron core 102, and under the action of the permanent magnet 104, the rotor structure 100 can rotate with respect to a stator to achieve the normal operation of an electric motor.

It needs to be specially emphasized that the rotor iron core 102 is mainly formed by a plurality of rotor punching sheets 1022 arranged in a stacked manner, the plurality of rotor punching sheets 1022 comprise at least two types: one type is a first punching sheet 1082, and the other type is a second punching sheet 1084, a magnetic barrier 106 can be selectively arranged on the first punching sheet 1082 or the second punching sheet 1084, and under the effect of the punching sheet without the magnetic barrier 106, some non-magnetically conductive materials which may hinder the normal processing of the rotor iron core 102 are isolated, and the possibility that the non-magnetically conductive materials enter the magnetic barrier 106 is reduced.

In an embodiment, a permanent magnet slot 103 is provided in the rotor iron core 102, the permanent magnet 104 can be disposed in the permanent magnet slot 103, and this helps the driving of the permanent magnet 104 by a magnetic force. The rotor iron core 102 is further provided with the magnetic barrier 106, the magnetic barrier 106 can be used as a structure for alleviating the degree of magnetic saturation through defining that the extending directions of the two ends of the magnetic barrier 106 face the permanent magnet 104 and the outer edge, and thus, in the rotating process of the rotor structure 100, the power density and the torque density of the electric motor are enhanced, the overload capacity of the electric motor is enhanced, the torque ripple of the electric motor is effectively improved, on the basis of reducing the used amount of the permanent magnet of the electric motor, i.e., reducing the production costs, the performance of the electric motor is greatly improved, the performance-cost ratio of the electric motor using the rotor structure 100 is enhanced, and the product competitiveness is enhanced.

The permanent magnet slot 103 can pass through the two end surfaces of the rotor iron core 102.

Furthermore, a first injection molding hole 1102 and a second injection molding hole 1104 are correspondingly provided in the first punching sheet 1082 and the second punching sheet 1084, and this helps accomplish an injection molding process through the injection molding holes in the two punching sheets.

Furthermore, for the arrangement that the first injection molding hole 1102 corresponds to the second injection molding hole 1104, it can be that the two injection molding holes are coaxially arranged, or the two injection molding holes communicate with each other.

Figure 10:
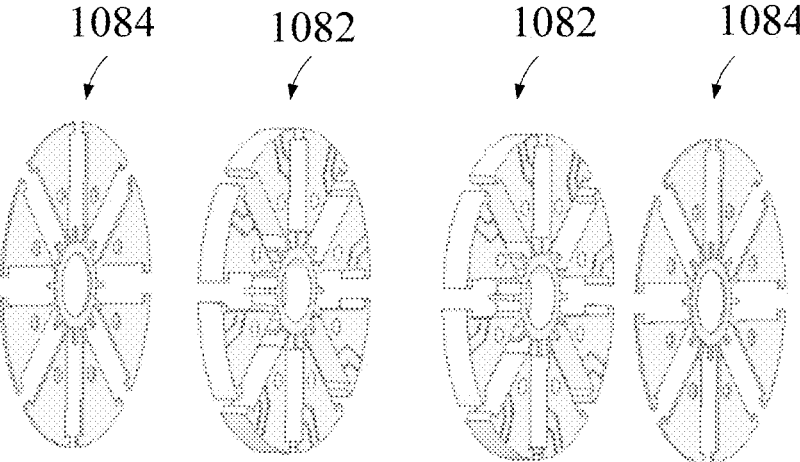
FIG. 10 is a schematic view of the arranging structure of a first punching sheet and a second punching sheet according to an embodiment of the present disclosure.

As shown in FIG. 10, a stacked manner of a plurality of rotor punching sheets is provided, and it is mainly used for a forward rotating electric motor, and the magnetic barrier of the first punching sheet and the magnetic barrier of the third punching sheet are both provided in the right half region of the sector area.

Figure 11:
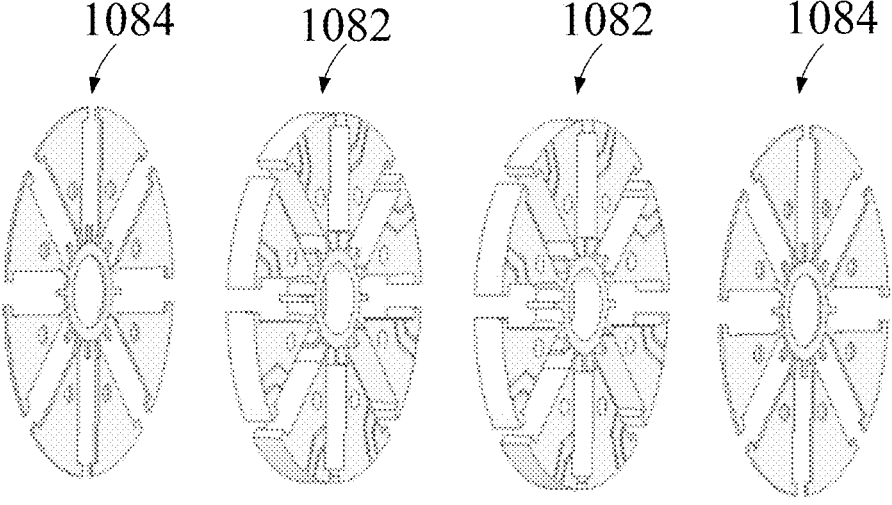
FIG. 11 is a schematic view of the arranging structure of a first punching sheet and a second punching sheet according to an embodiment of the present disclosure.

As shown in FIG. 11, a stacked manner of a plurality of rotor punching sheets is provided, and it is mainly used for a reverse rotating electric motor, and the magnetic barrier of the first punching sheet and the magnetic barrier of the third punching sheet are both provided in the left half region of the sector area.

Figure 12:
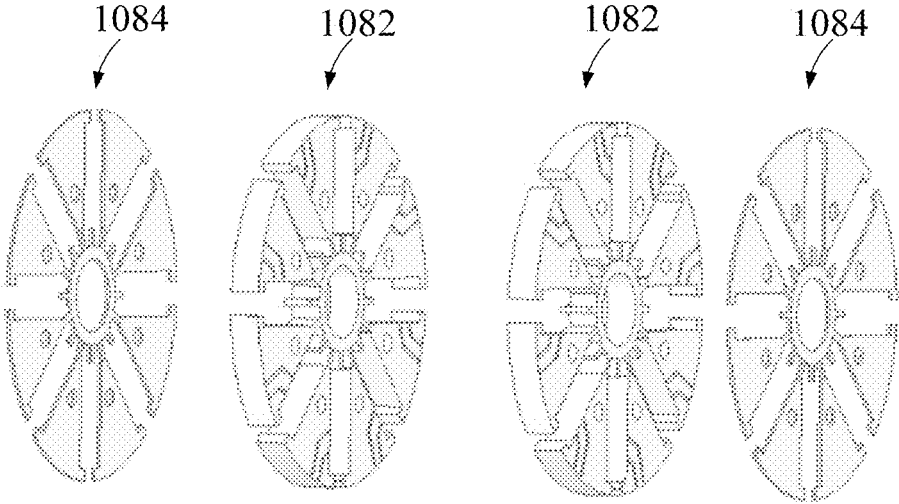
FIG. 12 is a schematic view of the arranging structure of a first punching sheet and a second punching sheet according to an embodiment of the present disclosure.

As shown in FIG. 12, a stacked manner of a plurality of rotor punching sheets is provided, and it is mainly used for a bidirectional rotating electric motor, and the magnetic barrier of the first punching sheet and the magnetic barrier of the third punching sheet are both provided in the left half region and the right half region of the sector area.

On the basis of any of the above embodiments, as shown in FIG. 2, the magnetic barrier 106 mainly comprises two portions, and they are respectively the first slot segment 1062 and the second slot segment 1064, and the first slot segment communicates with the second slot segment; the ends of the first slot segment and the second slot segment which deviate from each other respectively face the permanent magnet slot 103 and the circumferential edge of the rotor iron core 102; the two portions of the magnetic barrier 106 respectively face the structures of different positions, and the two portions need to communicate with each other, and thus, under the joint effect of the two portions, the effect can be achieved effectively that the cross-axis armature reaction of the electric motor is inhibited and the degree of magnetic saturation is alleviated.

For the first slot segment 1062, in an embodiment, the end of the first slot segment 1062 facing the permanent magnet slot 103 is directly communicated to the permanent magnet slot 103, and during the processing, it is possible to cut directly into the rotor iron core 102 from the side of the permanent magnet slot 103, and this helps the processing, for the structure, the first slot segment 1062 is directly communicated to the permanent magnet slot 103 to achieve the effect of inhibiting the cross-axis armature reaction of the electric motor.

In another embodiment, the end of the first slot segment 1062 facing the permanent magnet slot 103 does not communicate with the permanent magnet slot 103, i.e., there is a certain distance between them; for the entirety of the magnetic barrier 106, its one end is a closed structure, while for the structure, there is a certain distance between the first slot segment 1062 and the permanent magnet slot 103, and the effect of inhibiting the cross-axis armature reaction of the electric motor can further be achieved.

A first distance between the first slot segment 1062 and the permanent magnet slot 103 is larger than or equal to 0.2 mm.

For the second slot segment 1064, in an embodiment, the end of the second slot segment 1064 facing the circumferential edge is directly communicated to the circumferential edge, and during the processing, it is possible to cut directly from the outer side of the rotor iron core 102, and this helps processing, and for the structure, the second slot segment 1064 is directly communicated to the circumferential edge to achieve the effect of inhibiting the cross-axis armature reaction of the electric motor.

In another embodiment, the end of the second slot segment 1064 facing the circumferential edge does not communicate with the circumferential edge, i.e., there is a certain distance between them; for the entirety of the magnetic barrier 106, its one end is a closed structure, while for the structure, there is a certain distance between the second slot segment 1064 and the circumferential edge, and the effect of inhibiting the cross-axis armature reaction of the electric motor can further be achieved.

A second distance between the second slot segment 1064 and the circumferential edge is larger than or equal to 0.2 mm.

It needs to be emphasized that the communicating relationship of communicating the first slot segment 1062 and the second slot segment 1064 respectively with the permanent magnet slot 103 and the circumferential edge comprises four types of combinations, which are in an embodiment as follows: the first slot segment 1062 is communicated, and the second slot segment 1064 is not communicated; the first slot segment 1062 is communicated, and the second slot segment 1064 is communicated; the first slot segment 1062 is not communicated, and the second slot segment 1064 is communicated; the first slot segment 1062 is not communicated, and the second slot segment 1064 is not communicated.

In the case of communication, the q-axis inductance can be effectively reduced, the cross-axis armature reaction of the electric motor is inhibited, the saturation of the iron core is alleviated; in the case of no communication, the structural strength of the rotor can be ensured.

There are multiple permanent magnet slots 103 provided in the rotor iron core 102; the communicating relation between the first slot segment 1062 and the second slot segment 1064 of each permanent magnet slot 103 is independent, and thus can be selectively arranged flexibly according to actual needs.

In an embodiment, in the multiple magnetic barriers arranged corresponding to the same permanent magnet, the communicating relation between the first slot segment and the permanent magnet slot is consistent, and the communicating relation between the second slot segment and the outer edge of the rotor iron core is consistent. For the multiple magnetic barriers arranged corresponding to the same permanent magnet slot, the connecting relationships of connecting the first slot segment and the second slot segment respectively with the outer edge of the permanent magnet slot and the outer edge of the rotor iron core are limited to be consistent, to help improve the processing efficiency.

In an embodiment, in the multiple magnetic barriers arranged corresponding to the same permanent magnet, at least the communicating relations between the first slot segments of two adjacent magnetic barriers and the permanent magnet slot is inconsistent, and the communicating relations between the second slot segments and the outer edge of the rotor iron core is inconsistent. For the multiple magnetic barriers arranged corresponding to the same permanent magnet slot, the communicating relations of the first slot segment and the second slot segment are staggered, and it can be understood that there may be a relatively large armature inhibiting effect if the first slot segment communicates with the permanent magnet slot, however, due to a direct break design, it will produce certain affect to the strength, if the first slot segment does not communicate with the permanent magnet slot, it has certain strength, but the armature inhibiting effect will be slightly weaker, and it is the same case with the communicating relation between the second slot segment and the outer edge, through the staggered communicating relations, the armature inhibiting effect and the strength can be enhanced comprehensively, and the use feasibility of the rotor structure is improved.

In an embodiment, in the multiple magnetic barriers arranged corresponding to the same permanent magnet, there exists at least a case that the first slot segment of one magnetic barrier does not communicate with the permanent magnet slot, and the second slot segment does not communicate with the outer edge of the rotor iron core. For the multiple magnetic barriers arranged corresponding to the same permanent magnet slot, through limiting that the first slot segment and the second slot segment of the magnetic barrier respectively do not communicate with the permanent magnet slot or the outer edge, it can be understood that the structural strength of the rotor iron core in the operation process can be improved since the two ends are not communicated, and thus the entire stability of the entirety of the rotor structure during the rotation is improved.

In an embodiment, both the first slot segment and the second slot segment are straight-line segments, and this helps the processing, and in addition, through limiting that the included angle between the two straight-line segments is [60°, 120°], it helps to improve the effect of inhibiting the cross-axis armature reaction.

In another embodiment, it can further be limited that one of the first slot segment and the second slot segment is in a curve shape, or both of them are in a curve shape.

Figure 13:
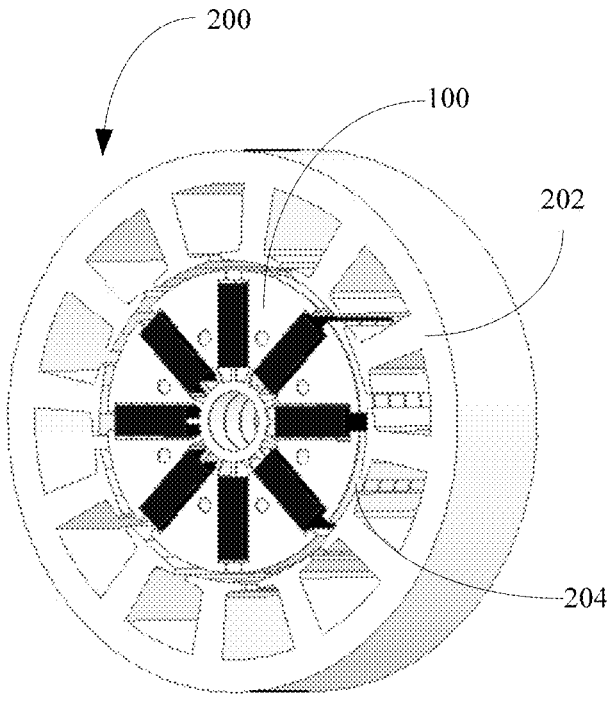
FIG. 13 is a schematic view of the structure of an electric motor structure according to an embodiment of the present disclosure.

As shown in FIG. 13, an electric motor structure 200 provided by the embodiment comprises a stator 202 and a rotor structure 100, the rotor structure 100 can rotate with respect to the stator 202; and the electric motor structure 200 is provided with the rotor structure 100 in any of the above embodiments, and thus has all the advantageous effects of any rotor structure, which will not be repeated herein.

It needs to be emphasized that the electric motor structure 200 comprises the above rotor structure 100, and therefore, firstly, the cross-axis armature reaction of the electric motor is effectively inhibited, the degree of magnetic saturation is alleviated, the load back electromotive force is reduced, and the torque density and the overload capacity of the electric motor are improved; secondly, the magnetic field harmonics of the rotor in an air gap 204 can be weakened, and the torque ripple of the electric motor can be improved.

Figure 14:
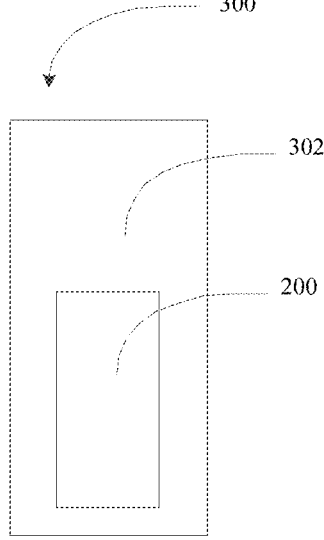
FIG. 14 is a schematic view of the structure of a clothing treating device according to an embodiment of the present disclosure.

As shown in FIG. 14, a clothing treating device 300 provided in the embodiment comprises a housing 302 and an electric motor structure 200 provided in the housing 302, the housing 302 is provided with the electric motor structure 200 in Embodiment 5, and thus has all the advantageous effects of the above electric motor structure 200, which will not be repeated herein.

Based on the rotor structure, the electric motor structure and the clothing treating device provided in the present disclosure, the magnetic barrier is selectively provided on the first punching sheet or the second punching sheet, and under the effect of the punching sheet without the magnetic barrier, some non-magnetically conductive materials that may hinder the normal processing of the rotor iron core are isolated, to reduce the possibility that the non-magnetically conductive materials enter the magnetic barrier.

In the specification of the present disclosure, the terms of "first", "second" and "third" are used only for the purpose of description and shall not be understood to indicate or imply any relative importance; and the term of "multiple" indicates two or more, unless otherwise explicitly specified or defined; the terms of "mount", "connected to", "connect with", "fixing" and the like should be understood in a broad sense, for example, the term "connected to" may be a fixed connection, and may further be a removable connection, or an integral connection; and the term of "connect with" may be a direct connection and may further be an indirect connection through an intermediate medium. A person of ordinary skills in the art could understand the specific meanings of the terms in the present disclosure according to specific situations.

In the description of the present disclosure, it needs to be understood that the orientation or position relations indicated by the terms of "upper", "lower", "left", "right", "front", "rear" and the like are based on the orientation or position relations shown in the accompanying drawings, and they are just intended to conveniently describe the present disclosure and simplify the description, and are not intended to indicate or imply that the devices or units as indicated should have specific orientations or should be configured or operated in specific orientations, and then should not be construed as limitations to the present disclosure.

In the description of the present specification, the descriptions of the phrases "one embodiment", "some embodiments" and "specific embodiments" and the like mean that the specific features, structures, materials or characteristics described in combination with the embodiment(s) or example(s) are included in at least one embodiment or example of the present disclosure. In the specification, the schematic representation of the above phrases does not necessarily refer to the same embodiment or example. Moreover, the particular features, structures, materials or characteristics described may be combined in a suitable manner in any one or more of the embodiments or examples.

The descriptions above are only some embodiments of the present disclosure, and are not configured to limit the present disclosure. For a person skilled in the art, the present disclosure may have various changes and variations. Any modifications, equivalent substitutions, improvements, etc. made within the spirit and principle of the present disclosure shall all be included in the protection scope of the present disclosure.

What is claimed is:

1. A rotor structure comprising:
a rotor iron core comprising at least one first punching sheet, at least one second punching sheet, and at least one third punching sheet that are stacked along an axial direction of the rotor iron core to form a plurality of permanent magnet slots arranged in a circumferential direction of the rotor iron core,
wherein:
at least one of the at least one first punching sheet, the at least one second punching sheet, or the at least one third punching sheet forms magnetic barriers adjacent to, and on at least one side of, the permanent magnet slots in the circumferential direction,
each of the magnetic barriers has a first end proximate a respective permanent magnet slot and a second end proximate an outer edge of the rotor iron core,
the at least one first punching sheet forms a first convex plate with protrusions extending radially outward from radially inward sides of the permanent magnet slots, the at least one second punching sheet forms a second convex plate with protrusions extending radially outward from radially inward sides of the permanent magnet slots,
the at least one third punching sheet forms a third convex plate with protrusions extending radially outward from radially inward sides of the permanent magnet slots, and
the protrusions of the third convex plate are higher than those of the first convex plate, or
the protrusions of the third convex plate are higher than those of the second convex plate; and
permanent magnets disposed in the permanent magnet slots and abutting the protrusions of the third convex plate.

2. The rotor structure according to claim 1, wherein:
the magnetic barriers are formed by the at least one first punching sheet, and
the at least one second punching sheet is provided on at least one end of the rotor iron core along the axial direction.

3. The rotor structure according to claim 2, wherein:
the at least one first punching sheet comprises multiple first punching sheets that are adjacent to one another; and
the at least one second punching sheet comprises two second punching sheets disposed on respective ends of the rotor iron core in the axial direction.

4. The rotor structure according to claim 1, wherein:
a number of the at least one third punching sheet is less than a number of the at least one first punching sheet; or
a number of the at least one third punching sheet is less than a number of the at least one second punching sheet.

5. The rotor structure according to claim 1, wherein:
the magnetic barriers are located on one side of the permanent magnet slots; or
a configuration of the magnetic barriers of at least one of the at least one first punching sheet, the at least one second punching sheet, and the at least one third punching sheet is different from a configuration of the magnetic barriers of at least one other of the at least one first punching sheet, the at least one second punching sheet, and the at least one third punching sheet.

6. The rotor structure according to claim 1, wherein:
the at least one first punching sheet forms a first injection molding hole,
the at least one second punching sheet forms a second injection molding hole, and
the second injection molding hole is aligned with the first injection molding hole.

7. The rotor structure according to claim 1, wherein
the magnetic barriers are provided proximate leading sides of the permanent magnet slots in a rotation direction of the rotor structure.

8. The rotor structure according to claim 1, wherein:
the first end is part of a first slot segment extending towards the respective permanent magnet slot; and
the second end is part of a second slot segment in communication with the first slot segment that extends towards the outer edge of the rotor iron core.

9. An electric motor structure comprising:
a stator structure; and
the rotor structure according to claim 1,
wherein the rotor structure is:
coaxially arranged with the stator structure, and configured to rotate relative to the stator structure unidirectionally or bidirectionally.

10. The electric motor structure according to claim 9, wherein the stator structure comprises:

a stator iron core comprising a plurality of stator convex teeth that are circumferentially arranged about an axis of the stator iron core; and a stator winding wound around the stator convex teeth.

11. A clothing treating device comprising:

a housing; and the electric motor structure according to claim 9, wherein the electric motor structure is provided in the housing.

12. A rotor structure comprising:

a rotor iron core comprising at least one first punching sheet, at least one second punching sheet, and at least one third punching sheet that are stacked along an axial direction of the rotor iron core to form a plurality of permanent magnet slots arranged in a circumferential direction of the rotor iron core, wherein:

at least one of the at least one first punching sheet, the at least one second punching sheet, or the at least one third punching sheet forms magnetic barriers adjacent to, and on at least one side of, the permanent magnet slots in the circumferential direction, each of the magnetic barriers has a first end proximate a respective permanent magnet slot and a second end proximate an outer edge of the rotor iron core, the at least one first punching sheet forms protrusions extending radially outward from radially inward sides of the permanent magnet slots, the at least one second punching sheet forms protrusions extending radially outward from radially inward sides of the permanent magnet slots, and the at least one third punching sheet forms protrusions:

extending radially outward from radially inward sides of the permanent magnet slots, and extending circumferentially from at least one of a circumferentially leading or trailing side of the permanent magnet slots towards an opposite side of the permanent magnet slots; and permanent magnets disposed in the permanent magnet slots and abutting the protrusions of the third convex plate.

* * * * *